United States Patent [19]
Prater

[11] Patent Number: 4,943,225
[45] Date of Patent: Jul. 24, 1990

[54] MANDREL FOR MAKING ELASTOMERIC ARTICLES

[76] Inventor: Ronald E. Prater, 2303 Sycamore Hills Dr., Fort Wayne, Ind. 46804

[21] Appl. No.: 292,811

[22] Filed: Jan. 3, 1989

Related U.S. Application Data

[63] Continuation-in-part of Ser. No. 24,067, Mar. 10, 1987, Pat. No. 4,797,081.

[51] Int. Cl.$^5$ .............................................. B29C 41/14
[52] U.S. Cl. .................... 425/275; 249/177; 249/183; 264/305; 425/274; 425/DIG. 44
[58] Field of Search ............... 425/275, 274, 270, 272, 425/804, DIG. 44; 264/305, DIG. 6, DIG. 37; 249/177, 183

[56] References Cited

U.S. PATENT DOCUMENTS

| | | | |
|---|---|---|---|
| 1,841,886 | 1/1932 | Gammeter | 264/154 |
| 1,851,505 | 3/1932 | Foley | 425/272 X |
| 1,948,608 | 2/1934 | Abbott, Jr. | 425/55 |
| 1,997,784 | 4/1935 | Beal | 264/304 |
| 2,053,371 | 9/1936 | Lee | 425/269 |
| 2,298,101 | 10/1942 | Beal | 264/154 |
| 2,605,505 | 8/1952 | Ruhland | 425/270 |
| 2,801,897 | 8/1957 | Fry | 425/275 |
| 2,824,407 | 2/1958 | Ebel | 425/275 X |
| 3,436,366 | 4/1969 | Modic | 524/862 |
| 3,847,848 | 11/1974 | Beers | 523/213 |

FOREIGN PATENT DOCUMENTS 3444108 6/1986 Fed. Rep. of Germany ...... 249/183

Primary Examiner—Richard L. Chiesa
Attorney, Agent, or Firm—Barnes & Thornburg

[57] ABSTRACT

A one-piece mandrel for making elastomeric articles by a dipping process has a one-piece body which includes at least one opening extending therethrough. A split extends from the opening through a cross-section of the one-piece body. At least a portion of the body adjacent the split is formed of an elastically resilient material to allow the split to open for removal of the elastomeric article after formation, and to cause the split to self-close after removal of the article from the mandrel. Closure of the split forms a substantially continuous molding surface in the immediate vicinity of the split. Proper alignment of the mating surfaces of the split is assured by irregular (non-linear) design of the split surfaces, or by use of an alignment element embedded in the mandrel. An especially advantageous material for forming the mandrel of the present invention is a silicon rubber molding compound. In an alternative embodiment, a cavity is formed in the body portion of the mandrel, and a rigid element is inserted into the cavity to produce a force on the cavity sidewalls. This force is transmitted through the mandrel body ot the mating, facing surfaces of the split, and assists in maintaining the split in a closed position. The mandrel is preferably formed by a molding process. An inner surface of the mold cavity is acid-etched to produce a textured surface on the mandrel.

53 Claims, 2 Drawing Sheets

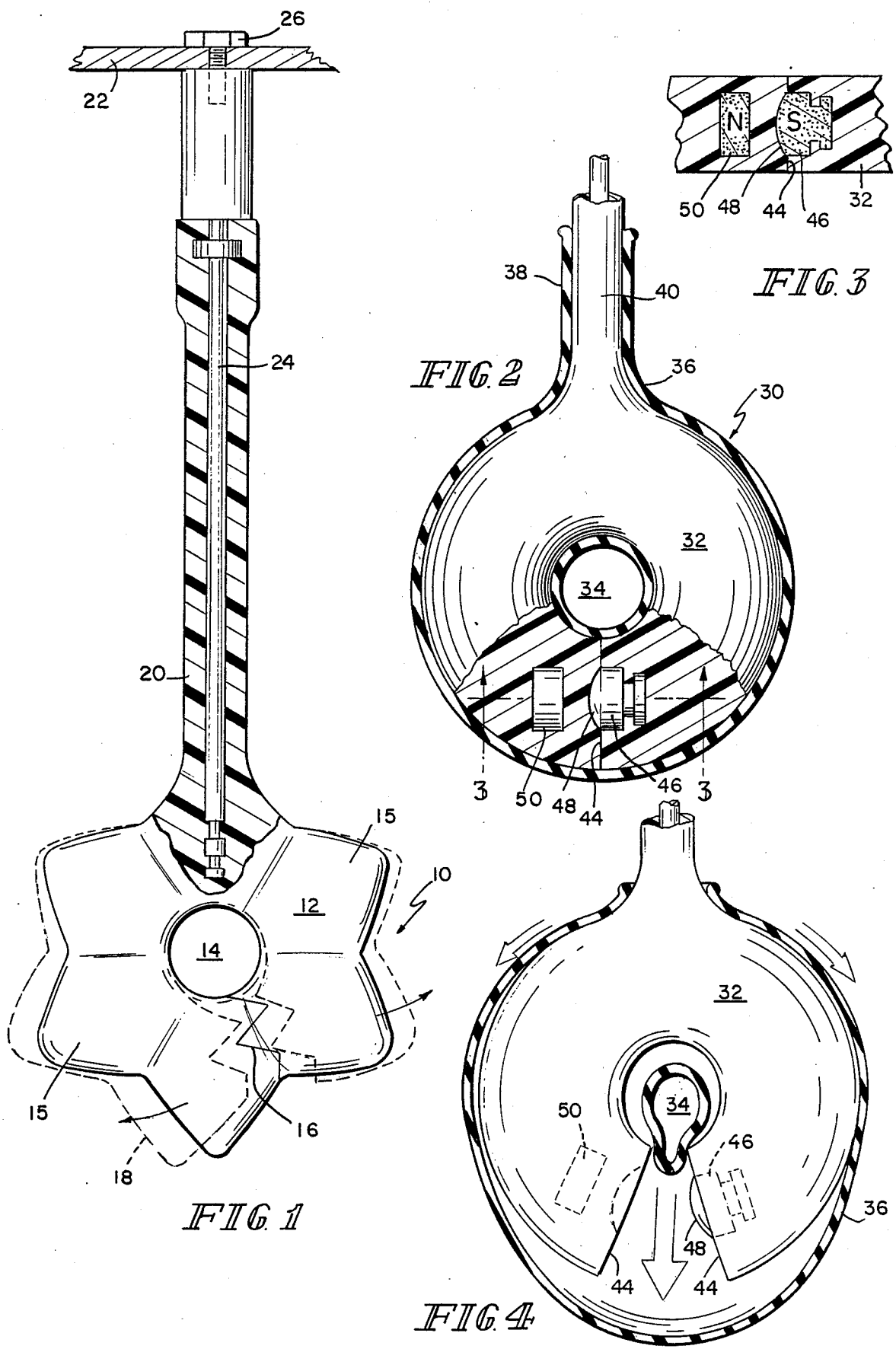

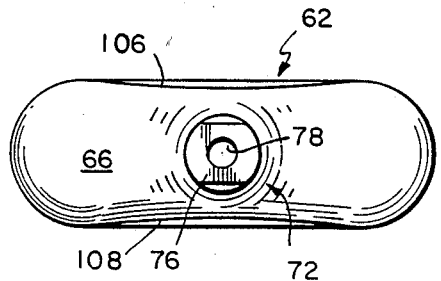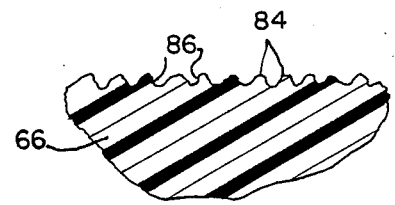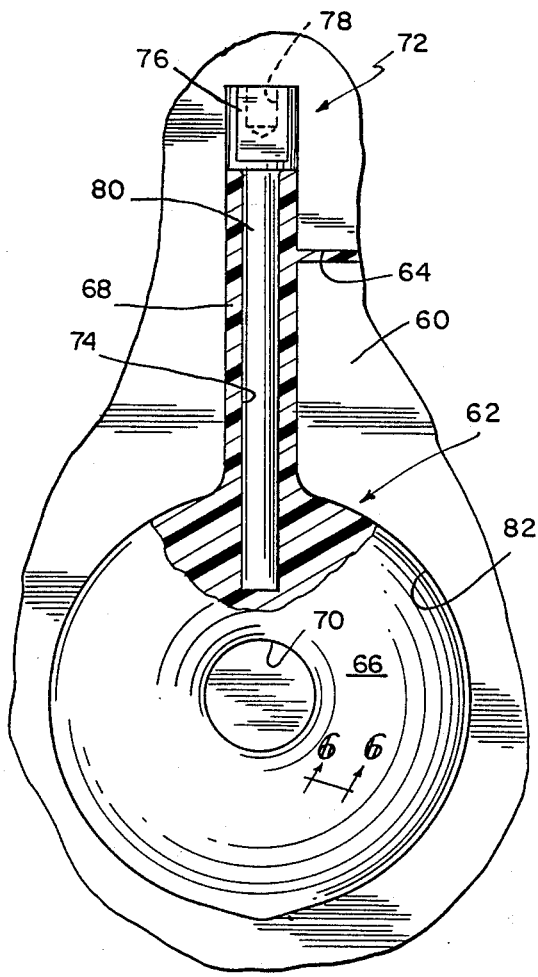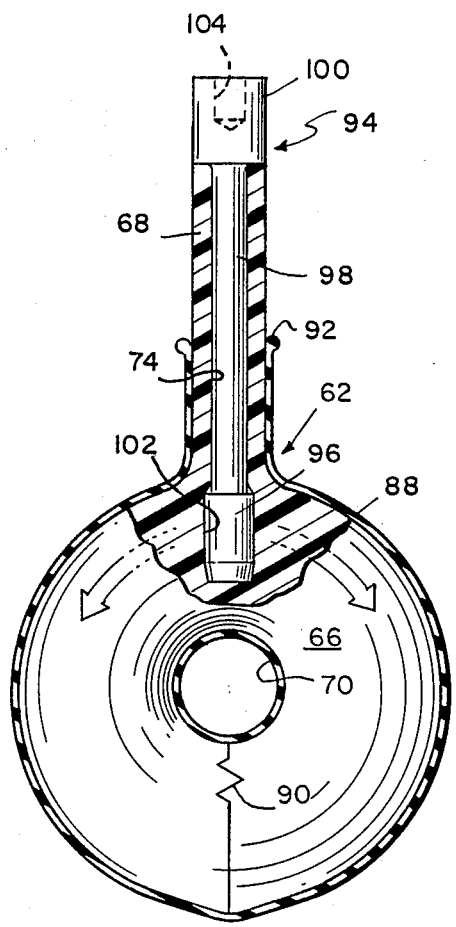

MANDREL FOR MAKING ELASTOMERIC ARTICLES

BACKGROUND AND SUMMARY OF THE INVENTION

This continuation-in-application of U.S. Ser. No. 024,067, filed Mar. 10, 1987 now U.S. Pat. No. 4,797,081, entitled "Mandrel for Making Elastomeric Articles".

This invention relates in general to a mandrel or form for making an elastomeric article by a dipping process and, in particular, to a one-piece mandrel formed of an elastically resilient material for making a thin-walled elastomeric article (such as a balloon). A particularly advantageous embodiment of the mandrel of the present invention, as described in detail below, is especially well-suited for making a balloon or like article having at least one opening or hole in the body thereof (i.e., a balloon or article having the shape of a torus or its topological equivalent).

A number of articles such as surgeons' gloves, translucent drug sundries, footwear, flexible squeeze toys, and metal-coated compounds are made by dipping processes. These processes include simple dipping, where one or more coats are applied with no coagulate being used; the Anode process, where a form is first dipped into coagulate and then into an elastomeric compound (such as natural rubber latex); and the Teague process, where the form is first dipped into an elastomeric compound and then into the coagulate. Of these processes, the Anode process enjoys the most popularity.

In the case of latex articles formed by the Anode process, the form or mandrel, which is usually aluminum, porcelain or stainless steel, is first dipped into the coagulate and then into the latex compound which is contained in a dipping tank provided with mechanical agitation and a temperature controlled jacket. The form may be dipped manually or by automatic operation. After withdrawal, the form is usually rotated to ensure even distribution of the deposited latex. Leaching, drying and preliminary finishing operations such as beading or trimming then follow. The latex articles may be vulcanized in circulating hot air, steam or hot water. Vulcanization may take place on or off the form. The cured articles are then stripped from the form in a wet or dry condition. Finishing operations typically include washing and drying. Due primarily to the nature of the stripping operation, it is inherently difficult to make relatively small, thin-walled latex articles, such as balloons, by a dipping process when such articles are provided with one or more openings in the bodies thereof. U.S. Pat. No. 2,053,372 to Lee relates to a technique for making irregularly shaped inflatable articles using forms which are collapsible so as to allow for their removal from the formed articles subsequent to the dipping process. FIG. 5 of Lee's patent shows a form 39 in the shape of a flying horse having a central opening 41 formed therein. Form 39 is made of a relatively rigid material, such as a filled manila paper, and is destroyed in the stripping process. According to Lee, it is not possible to make such a form of a flexible, collapsible material (such as rubber) since the form must be broken to remove the form from the article.

U.S. Pat. Nos. 1,841,886 and 1,948,608 show annular forms used in making relatively large endless tubes of rubber (i.e., inner tubes). Each of these forms is provided with a split to allow for removal of the formed tube, and a connecting element, such as a bolt or a locking mechanism, to draw the facing surfaces of the split together. While such an arrangement is appropriate for use in forming the relatively large, thick-walled articles described in these patents, a similar arrangement would be wholly unsuitable for and impractical to implement in manufacturing large numbers of relatively small, thin-walled articles (such as balloons). The arrangements described in the above-referenced patents rely on manually operated mechanical locking mechanisms to hold the split in the mandrel body together. In manufacturing large numbers of relatively small, thin-walled articles, too much time would be required during the stripping process to disconnect and reconnect such locking mechanisms. Such an arrangement would also be impractical to implement in manufacturing relatively thin-walled articles due to the difficulty in obtaining a substantially continuous surface in the vicinity of the split. While thick-film processes are relatively tolerant of surface imperfections in the finished product, such imperfections Cannot be tolerated in thin-film products. Accordingly, mandrels which are designed for use in "thick-film" environments may be totally unsuitable for use in the production of thin-film products.

An object of the present invention is to provide an improved form or mandrel for making elastomeric articles by a dipping process.

Another object of the present invention is to provide a mandrel which can be efficiently used in a high volume production setting to produce articles, such as balloons, which are provided with at least one opening in the bodies thereof.

Yet another object of the present invention is to provide a mandrel for forming articles having at least one opening in the bodies thereof in which the articles can be easily removed from the mandrel.

Still another object of the present invention is to provide a mandrel which has a substantially continuous surface permitting the manufacture of thin elastomeric articles without objectionable seams and flash.

A further object of the present invention is to provide a one-piece mandrel having a self-closing and self-aligning split through a cross-sectional portion thereof.

Yet another object of the present invention is to provide apparatus and a method for making a mandrel which has the desired advantages and characteristics.

These and other objects of the invention are attained in a one-piece mandrel for making an elastomeric article by a dipping process, which has a one-piece body having at least one opening therein and a split extending from the opening through a cross-section of the body. The body is formed of an elastically resilient material so as to allow the split to be opened for removal of the elastomeric article after formation, and so as to cause the split to re-close after removal of the article from the mandrel to form a substantially continuous surface on the mandrel in the vicinity of the split. In a preferred embodiment of the invention, a portion of the one-piece mandrel body extends through a wall of the article. In an especially preferred embodiment, this portion provides a molding surface for forming a hollow stem on the article. The portion of the one-piece body which extends through the wall of the article is also preferably adapted for attaching the mandrel to a dipping apparatus.

In the preferred embodiment, the mandrel is provided with means for causing the mating facing surfaces of the split to self-align upon closure thereof. In one embodiment, the means for aligning the surfaces include the use of an "irregular" split in which at least one protrusion is formed on a first of the surfaces, and a mating depression is formed in the other surface. Alternatively, an alignment element, which is at least partially embedded in the one-piece body, may be used. A portion of the alignment element extends from a first of the mating surfaces, and a mating depression to accept the extending portion of the alignment element is formed in the other surface. In an especially preferred embodiment, the alignment element is formed of a ferro-magnetic material (such as steel), and a magnetized element is embedded in the mandrel adjacent the depression in the second of the mating surfaces to assist in holding the mating surfaces together during the dipping process.

In a preferred embodiment of the invention, the one-piece mandrel is formed of a silicon rubber compound having a Shore A hardness ranging from 20-90 (and preferably from 60-75), a tensile strength of 500-1,100 pounds per square inch, a percentage elongation of 150-360 percent, a tear strength of 55-120 pounds per square inch, and a continuous service temperature rating of at least 212° F. Such material is resistant to water, mild acids and bases.

An alternative embodiment of a mandrel suitable for making a thin-walled elastomeric article by a dipping process comprises a body portion and a stem portion extending generally radially outwardly from the body portion. The body portion is formed of an elastically resilient material and has at least one through opening therein. The body portion is also provided with a split which extends from the opening through a first cross-section of the body portion. The stem portion and body portion are formed to include a cavity which extends through the stem portion and into a second cross-section of the body portion. Means are provided in the cavity for exerting a force on a sidewall of that portion of the cavity which extends into the second cross-section of the body portion. This means is preferably a relatively rigid element having a dimension which is greater than a corresponding dimension of the cavity in the body portion. In the illustrated embodiment, the relatively rigid element is an elongate rod having a first end portion which extends into that portion of the cavity in the body portion. The first end portion has a circular cross-section and a diameter which is greater than that of the corresponding portion of the cavity. The force exerted on the sidewall of the cavity is transmitted through the body Portion of the mandrel so as to exert a closing force on the mating facing surfaces of the split.

In one embodiment of the mandrel, an outer surface of at least the body portion of the mandrel is textured. Texturing is preferably accomplished by acid etching the interior surface of a mold cavity which is used to form the mandrel. The surface of the mold cavity is etched or pitted to a depth which ranges from approximately 0.0002" to approximately 0.002" to achieve the desired textured surface. An average depth or approximately 0.0005" is generally preferred.

A preferred method of making a mandrel according to the present invention includes the steps of forming at least a body portion of the mandrel from an elastomeric material in a cavity mold, and forming a split from an opening in the body portion of the mandrel through a cross-section of the body to an outer peripheral surface of the mandrel. The split is preferably located in a cross-section of the body portion which is in substantially opposing relation to a stem portion of the mandrel. An especially preferred method further includes the steps of forming a cavity in the body of the mandrel, and inserting a relatively rigid element, having at least one dimension which is greater than the corresponding dimension of the cavity, into the cavity to exert a force on a sidewall of the cavity. This force is transmitted through the body portion of the mandrel and tends to maintain the split in a closed position when the mandrel is used for making a thin-walled elastomeric article by a dipping process. Apparatus for practicing the preferred method includes a cavity mold having an internal shape which approximates the desired shape of the mandrel, means for forming a cavity in the body of the mandrel, and means for exerting a force on an inside surface of the cavity. The means for forming a cavity in the body of the mandrel preferably comprises a tool which is adapted for mounting in the mold prior to placing the uncured elastomeric material in the mold. The means for exerting a force on an inside surface of the cavity preferably comprises a relatively rigid element having at least one dimension which is greater than a corresponding dimension of the cavity.

Other objects, advantages and novel features of the present invention will become apparent from the following detailed description of the invention when considered in conjunction with the accompanying drawings.

BRIEF DESCRIPTION OF THE DRAWINGS

FIG. 1 shows a schematic view of a mandrel construction in accordance with the present invention.

FIG. 2 shows a schematic view of an alternative embodiment of the mandrel of the present invention.

FIG. 3 shows a partial sectional view taken along line 3—3 of FIG. 2.

FIG. 4 illustrates the removal of a formed article from the mandrel shown in FIG. 2.

FIG. 5 shows a schematic view of apparatus for making a mandrel according to the present invention.

FIG. 6 shows a sectional view taken along line 6—6 of FIG. 5.

FIG. 7 shows a schematic view of an embodiment of the mandrel formed in the apparatus of FIG. 5.

FIG. 8 shows a top view of a mandrel formed in the apparatus of FIG. 5 after removal from the mold.

DETAILED DESCRIPTION OF THE DRAWINGS

FIG. 1 shows a schematic view of an embodiment of a one-piece mandrel 10 constructed in accordance with the present invention. Mandrel 10 includes a body portion 12 which is provided with an opening 14 which, in this embodiment, extends through the approximate center of body portion 12. The shape of body portion 12 in this embodiment is somewhat irregular in that a number of lobes 15 are formed around the outer periphery of body portion 12. This shape is, of course, imparted to the articles formed on mandrel 10, and a wide variety of different shapes and lobe configurations may be used. Mandrel 10 is preferably formed of an elastically resilient material which is described in additional detail below.

Extending from opening 14 through a cross-section of body portion 12 is a split 16 which, in the preferred embodiment shown in FIG. 1, is irregular (i.e., non-planar) in design. This irregular design produces mating protrusions and depressions, respectively, on facing surfaces of the split. These protrusions and depressions assure precise re-alignment of the mating surfaces when the split is opened and subsequently allowed to close. Thus, the surface of mandrel 10 in the immediate vicinity of split 16 will be substantially continuous and smooth.

Mandrel 10 is preferably formed of an elastically resilient material which will allow split 16 to be opened for removal of the elastomeric article formed on the mandrel, and which will cause the split to close after removal of the article from the mandrel. A portion of mandrel 10 in FIG. 1 is shown, in dashed lines, after being elastically deformed so as to open split 16. This portion of mandrel 10 is generally designated by reference numeral 18. The resilience of the material forming the mandrel is such that, when portion 18 is subsequently released, split 16 will be closed by the resilience and elasticity of the material forming the mandrel. This is an important and advantageous feature of the mandrel of the present invention since the stripping operation is normally conducted on a large number of such mandrels at a given stage of the production process, and separate operations to unlock or otherwise disengage the splits on the individual mandrels prior to stripping, and to close the splits on individual mandrels after stripping, would greatly increase the cost and complexity of the manufacturing process.

On a side of mandrel 10 which is almost directly opposite from split 16 is an elongate portion 20 of mandrel 10 which extends outwardly from body portion 12 to form a means by which mandrel 10 may be attached to a dipping apparatus 22 (not shown in detail). In the preferred embodiment illustrated, a metallic element 24 is embedded inside portion 20 and is attached to dipping apparatus 22 by means of bolt 26. The surface of elongate portion 20 immediately adjacent body portion 12 preferably provides a molding surface to form a hollow stem on the article to be formed on mandrel 10.

FIG. 2 shows an alternative embodiment of the present invention which comprises a one-piece mandrel 30 having a body portion 32 provided with an opening 34 extending through the approximate center of body portion 32. Mandrel 30 has been used to form, by a dipping process, article 36 which is a doughnut-shaped balloon provided with a stem 38 through which the balloon is inflated. Stem 38 is formed around the surface of portion 40 of mandrel 30, which portion intersects the outer Periphery of body portion 32 and extends upwardly in FIG. 2 to be attached to a dipping apparatus which is not illustrated.

Body portion 32 is provided with a split 44 which extends from opening 34 through a cross-section of body portion 32. Unlike split 16 in FIG. 1, split 44 is generally planar in design, except that, in the preferred embodiment shown in FIG. 2, an alignment element 46 is embedded in mandrel 30 in the immediate vicinity of the split. At least a portion of alignment element 46 extends through the plane of split 44 into a mating depression 48 formed in the adjacent mating surface of split 44. As with the mandrel discussed in connection with FIG. 1, mandrel 30 is formed of an elastically resilient material which allows split 44 to be opened for removal of article 36 subsequent to the dipping process, and which causes split 44 to close after the removal or stripping operation is complete. The removal of article 36 from mandrel 32 is illustrated in FIG. 4 of the drawings. Alignment element 46 and mating depression 48 assure that the closing of split 44 results in a substantially continuous and smooth molding surface in the vicinity of the split.

Alignment element 46 is preferably made of a ferromagnetic material such as steel. In an especially preferred embodiment of the invention, a magnetized element 50 is embedded in mandrel 30 immediately adjacent to depression 48, and the portion of alignment element 46 which extends into depression 48, to assist in holding split 44 firmly together during the dipping process. If needed or desired, both elements 46 and 50 may be formed of magnetized materials, as illustrated in FIG. 3.

The material used to form mandrels such as those described above must be elastically resilient in order for the mandrels to function as intended, and must also be capable of withstanding the conditions of the manufacturing environment for prolonged periods. The inventor has found that a silicon rubber compound having the following characteristics (when cured) is especially advantageous in the practice of the present invention:

Shore A Hardness: 20-90 (preferably 60-75)
Tensile Strength (lbs./in$^2$): 500-1,100
Elongation (%): 150-360
Tear strength (lbs./in$^2$): 55-120
Continuous Service Temperature: greater than 212° F.

A specific material which has such characteristics is RTV 664 silicon rubber molding compound manufactured by the General Electric Company. Other materials can be used as well. It is also possible that two or more materials could be used to form a mandrel having the functional characteristics of those described above. Such a mandrel would be considered to fall within the scope of the present invention, as defined by the claims which follow below.

FIGS. 5-8 illustrate additional aspects and embodiments of the invention, as will now be described. FIG. 5 shows portions of a cavity mold 60 which is used to form a mandrel 62 in accordance with the present invention. Mold 60 is provided with an internal mold cavity having a shape which closely approximates, or is essentially identical to, the desired shape of mandrel 62. Mold 60 is provided with an inlet 64, which is schematically depicted in FIG. 5, through which material to form mandrel 62 enters mold 60. Other inlets and/or outlets may be provided as required or desired. Molding processes which may be used in practicing the invention include compression molding, transfer molding and injection molding. Specific requirements and techniques relating to these molding processes are well known to those of ordinary skill in the molding arts, and form no part of the present invention. The present contribution to the art lies in recognition of the fact that mandrels of the type described and illustrated herein may be successfully produced by such molding processes, and not in the details of the processes themselves. At present, use of the transfer process is preferred. This method produces better seams and less flash than the compression process, and is more cost-effective than the injection process.

Mandrel 62 is formed to include a body portion 66 and a stem portion 68. In the preferred embodiment illustrated, body portion 66 and stem portion 68 are integrally formed in a molding process from an elastically resilient material, such as a silicon rubber molding compound. A through opening 70 is provided in body portion 66. The mandrels illustrated in FIGS. 2, 4, 5 and 7 have doughnut-shaped body portions, with the through opening extending through the approximate center of the body portions. As noted above and as illustrated in FIG. 1, mandrels having other shapes may be constructed using the principals of the present invention.

The arrangement of FIG. 5 further includes a molding tool 72 which is used to form a cavity 74 which extends through stem portion 68 of mandrel 62, and into a cross-section of body portion 66. Tool 72 has a head portion 76 which includes a threaded hole 78 which is used for mounting tool 72 in mold 60. Tool 72 further includes an elongate rod-shaped portion 80 which defines the shape of cavity 74. In the illustrated embodiment, rod 80 has a circular cross-section and a generally uniform diameter. Other shapes and types of cavity-defining tools may also be used.

An additional aspect of mold 60 and mandrel 62 relates to the surface characteristics of mandrel 62, as controlled by the surface characteristics of the corresponding internal surface 82 of mold 60. In the preferred embodiment of the invention, interior surface 82 of mold 60 is acid-etched to an average depth of approximately 0.0005" to produce a textured finish on surface 82 and, correspondingly, on the external surfaces of mandrel 62. This feature increases the wetability of mandrel 62, assuring the production of a more consistent elastomeric article in the subsequent dipping process. While an average pit depth of 0.0005" is preferred, other depths will provide satisfactory results. On the high side, the inventor has achieved satisfactory results with a surface which was etched to an average depth of 0.001", and believes that an average depth of 0.002" will also suffice. As the surface roughness increases, results will eventually become unacceptable due to the thin-walled nature of the product. On the low side, a limit does not arguably exist since a smooth form may be used. However, to achieve the desired increase in wetability, an average depth of at least approximately 0.0002" is recommended.

The nature of the textured surface produced is illustrated in FIG. 6, which is a section taken along line 6—6 of FIG. 5. Line 6—6 extends through a part of body portion 66 of mandrel 62. The "peaks" 84 and "valleys" 86 illustrated in FIG. 6 are approximately 0.0005" in height and depth, respectively. Although an acid etching process is presently preferred for producing the textured internal surfaces of the mold, other techniques for producing a functionally equivalent surface may be used. A suitable acid etching process for the present application has been developed by Tenibac-Graphion, Inc. of Mount Clemens, Miss. under the designation of No. ST1.

FIG. 7 shows mandrel 62 after its removal from mold 60 and after further processing as will now be described. FIG. 7 also shows, in cross-section, an elastomeric article 88, in the form of a doughnut-shaped balloon, of the type which may be formed in a dipping process which utilizes mandrel 62. As illustrated in FIG. 7, mandrel 62 has been provided with an irregularly-shaped split 90 which extends from opening 70 through a cross-section of body portion 16. As discussed above in connection with split 16 in FIG. 1, split 90 is preferably irregular in design to produce mating protrusions and depressions, respectively, on the mating, facing surfaces of split 90. These protrusions and depressions assure precise realignment of the mating, facing surfaces when split 90 is opened and subsequently allowed to close. Split 90 allows for removal of article 88 from mandrel 62 in the manner illustrated in FIG. 4 above. As also noted in connection with the embodiments discussed above, split 90 is located in generally opposite relation, relative to opening 70, to stem portion 68 and, thus, to opening 92 in elastomeric article 88. This relationship allows for removal of article 88 from mandrel 62 in a substantially continuous, uninterrupted operation, i.e., article 88 is grasped and pulled downwardly, as illustrated in FIG. 4, to effect its removal from mandrel 62 in a continuous uninterrupted motion. While it may be possible to orient split 90 in a different manner (e.g., immediately adjacent stem portion 68) without completely destroying the utility of mandrel 62, the application of a more involved, multidirectional force would be required to effect removal of article 88. While split 90 in FIG. 7 is shown to be almost directly opposite from stem 68, it will be readily apparent to those of ordinary skill in the art that some degree of latitude will be permissible in locating split 90 without sacrificing the benefit achieved in the arrangement illustrated.

In addition to the provision of split 90, mandrel 62 has been further modified (after its removal from mold 60) by removing tool 72 to expose cavity 74, and by inserting stem 94 into cavity 74. Stem 94 comprises an elongate rod having a first end portion 96, a central portion 98, and a second end portion 100. First end portion 96 extends into that portion 102 of cavity 74 which is formed in the cross-section of body portion 66 of mandrel 62. End portion 96 of stem 94 is formed of a relatively rigid material (as compared to the relatively resilient material which forms body portion 66 of mandrel 62), is cylindrically shaped, and has a diameter which is greater than the internal diameter of portion 102 of cavity 74. Accordingly, when first end portion 96 is inserted into portion 102 of cavity 74, a compressive force is exerted on the sidewall of the cavity. This force is transmitted through body portion 66, as indicated by the large arrows, so as to tend to hold the mating, facing surfaces of split 90 in mating and facing contact. The magnitudes of these forces may be adjusted by, for example, varying the diameters and compressibility of portion 102 of cavity 74 and/or first end portion 96. The goal is to assure that split 90 will be fully closed and held together before and during the dipping process, while being allowed to open when article 88 is pulled downwardly for removal from the mandrel.

Central portion 98 of stem 94 fills that portion of cavity 74 which extends through stem portion 68 of mandrel 62. As is the case with portion 102 of cavity 74 and first end portion 96, central portion 98 and the adjacent cavity have generally circular cross-sections, and are substantially uniform in diameter along their lengths. Other cross-sectional shapes, including non-uniform shapes, can be used when desired or required.

Second end portion 100 is provided with threaded hole 104 which may be used for mounting mandrel 62 to a dipping apparatus. Stem 94 is preferably inserted and held in cavity 74 without the aid of adhesives or any other type of permanent or semi-permanent fixation. If desired, of course, fixation may be provided.

Tool 72 and stem 94 are preferably made from metal, such as aluminum. However, other suitably rigid and durable materials may also be used.

FIG. 8 shows a top view of mandrel 62 after its removal from mold 60, but before removal of tool 72 to expose cavity 74. As can be seen in this top view, mold 60 is formed to provide slight indentations 106 and 108 on either side of body portion 66 in the areas immediately adjacent portion 102 of cavity 74. The primary function of indentations 106 and 108 is to prevent the stem of the balloon from inflating before, or at the same time as the body portion inflates. These indentations also tend to compensate for the outward "swelling" of the mandrel body which results from the insertion of first end portion 96 of stem 94 into portion 102 of cavity 74.

Following is a brief summary of the method of making a mandrel according to the present invention. The process begins when an elastomeric material is transferred or otherwise placed into a cavity mold having an internal shape which approximates the desired shape of the mandrel. As noted above, this desired shape may be at least partially defined by molding tool 72 which forms a cavity in the body of the mandrel. After being allowed to cure, the material is removed from the mold and a split (preferably irregular) is made through a cross-section of the body portion of the mandrel. The split extends from a surface which defines a through opening in the body portion to an outer peripheral surface of the mandrel. The resilience of the elastomeric material used to form the mandrel may, in some cases, be sufficient to maintain the split in a closed position when the mandrel is used for making a thin-walled elastomeric article by a dipping process. However, in some cases, additional means may be provided to assist and assure maintenance of mating contact between facing surfaces of the split. In one embodiment, such additional means is provided by forming a cavity in the body portion of the mandrel, and inserting a relatively rigid element, having at least one dimension which is greater than a corresponding dimension of the cavity, into the cavity to exert a force on the cavity side wall. The force is transmitted through the body portion of the mandrel so as to tend to exert a closing force on the split. In the embodiment of the invention illustrated in FIGS. 5 and 7, a molding tool 72 is used to form a cavity which extends through a stem portion 68 and into the body portion 66 of the mandrel. After the material has cured and the mandrel has been removed from the mold, tool 72 is removed to expose the cavity. A stem 94 having a generally elongate central portion 98 and a first end portion 96 is then inserted into the cavity. End portion 96 extends into portion 102 of the cavity, and has a diameter which is greater than the diameter of the cavity. This arrangement produces the desired closing force which is transmitted to the surfaces of the split.

From the preceding description of the preferred embodiments, it is evident that the objects of the invention are attained. Although the invention has been described and illustrated in detail, it is to be clearly understood that this description is to be taken by way of illustration and example only and is not to be taken by way of limitation. The spirit and scope of the invention are to be limited only by the terms of the appended claims.

What is claimed is:

1. A mandrel for making a thin-walled elastomeric article by a dipping process, comprising:
    a body portion formed of an elastically resilient material and having at least one through opening therein, and having a split extending from the opening through a first cross-section of the body portion;
    a stem portion extending generally radially outwardly from the body portion;
    wherein said stem portion and said body portion are formed to include a cavity which extends through said stem portion and into a second cross-section of said body portion, and wherein said cavity and said split are located on generally opposite sides of said through opening; and
    means disposed in at least that portion of the cavity which extends into the second cross-section of the body portion for exerting an outwardly directed force on a sidewall of the cavity, said force being directed against and transmitted into the body portion of the mandrel.

2. A mandrel according to claim 1, wherein said means disposed in the cavity comprises relatively rigid means having a dimension which is greater than a corresponding dimension of the cavity in the body portion of the mandrel.

3. A mandrel according to claim 1, wherein said means disposed in the cavity comprises an elongate rod having a first end portion disposed in that portion of the cavity which extends into the second cross-section of the body portion, and wherein said first end portion of the rod has a dimension which is greater than a corresponding dimension of the cavity in the body portion.

4. A mandrel according to claim 3, wherein said elongate rod has a second end portion positioned for mounting to a dipping apparatus.

5. A mandrel according to claim 3, wherein said elongate rod has a substantially circular cross-section.

6. A mandrel according to claim 1, wherein said cavity has a substantially circular cross-section and a substantially constant diameter throughout its length.

7. A mandrel according to claim 1, wherein said split has mating facing surfaces, and wherein said force tends to hold the surfaces of the split in mating and facing contact.

8. A mandrel according to claim 1, wherein said body portion is formed from an elastomeric compound, such as silicon rubber molding compound, and wherein said means disposed in the cavity is formed of a metal, such as aluminum.

9. A mandrel according to claim 1, wherein an outer surface of at least one of said body portion and said stem portion, upon which the elastomeric article is formed, is textured so as to increase the wetability of said surface.

10. A mandrel according to claim 9, wherein said textured surface is pitted to a depth of approximately 0.0002" to 0.002".

11. A mandrel according to claim 9, wherein said textured surface is pitted to an average depth of approximately 0.0005".

12. A mandrel according to claim 1, wherein said body portion is doughnut-shaped, with said at least one opening extending through a central region of said body portion, and wherein said split extends from the opening through the first cross-section of the body portion adjacent one side of the opening, and wherein said cavity extends along the second cross-section of the body portion adjacent a substantially opposing side of the opening.

13. A mandrel for making a thin-walled elastomeric article by a dipping process, comprising:
    a body portion formed of an elastically resilient material and having at least one through opening therein, and having a split extending from the opening through a first cross-section of the body portion, and having a cavity extending along a second cross-section of the body portion, wherein said cavity and said split are located on generally opposite sides of said through opening; and means disposed in said cavity for exerting an outwardly directed force on a sidewall of the cavity, said force being directed against and transmitted into the body portion of the mandrel.

14. A mandrel according to claim 13, wherein said means disposed in said cavity comprises relatively rigid means having a dimension which is greater than a corresponding dimension of the cavity.

15. A mandrel according to claim 13, wherein said split has mating facing surfaces, and wherein said force tends to hold the surfaces of the split in mating and facing contact.

16. A mandrel according to claim 13, further comprising means extending generally radially outwardly from said body portion for mounting the mandrel to a dipping apparatus.

17. A mandrel according to claim 16, wherein said means extending outwardly comprises a stem portion, and wherein said cavity extends from the second cross-section of the body portion through said stem portion.

18. A mandrel according to claim 17, wherein said means disposed in said cavity comprises an elongate rod having a first end portion disposed in that portion of the cavity which extends along the second cross-section of the body portion, and wherein a dimension of the first end portion of the rod is greater than a corresponding dimension of the cavity in the body portion.

19. A mandrel according to claim 18, wherein said elongate rod further comprises a central portion disposed in that portion of the cavity which extends through said stem portion, and a second end portion positioned for mounting to a dipping apparatus.

20. A mandrel according to claim 13, wherein said body portion is doughnut-shaped, with said at least one opening extending through a central region of said body portion, and wherein said split extends from the opening through the first cross-section of the body portion adjacent one side of the opening, and wherein said cavity extends along the second cross-section of the body portion adjacent a substantially opposing side of the opening.

21. A mandrel according to claim 20, further comprising a stem portion extending generally radially outwardly from the body portion.

22. A mandrel according to claim 21, wherein said stem portion extends outwardly from said body portion adjacent said second cross-section, and wherein said cavity extends from said body portion through said stem portion.

23. A mandrel according to claim 22, wherein said means disposed in said cavity comprises an elongate rod having a first end portion disposed in that portion of the cavity which extends along the second cross-section of the body portion, and wherein a dimension of the first end portion of the rod is greater than a corresponding dimension of the cavity in the body portion.

24. A mandrel according to claim 23, wherein said elongate rod further comprises a central portion disposed in that portion of the cavity which extends through said stem portion, and a second end portion positioned for mounting to a dipping apparatus.

25. A mandrel according to claim 13, wherein at least a portion of an outer surface of the body portion, upon which the elastomeric article is formed, is textured so as to increase the wetability of said surface.

26. A mandrel according to claim 25, wherein said textured surface is pitted to a depth of approximately 0.0002' to 0.002'.

27. A mandrel according to claim 25, wherein said textured surface is pitted to an average depth of approximately 0.0005".

28. A mandrel for making a thin-walled elastomeric article by a dipping process, comprising:

a body portion having at least one through opening therein, and having a split extending from the opening through a first cross-section of the body, at least a portion of said body being elastically movable to allow the split to open for removal of the elastomeric article after formation thereof;

means for closing the split to form a substantially continuous surface of the mandrel in the vicinity of the split;

a stem portion extending generally radially outwardly from the body portion; and means for mounting the stem portion to a dipping apparatus;

wherein said stem portion and said split extending through a cross-section of the body are disposed on generally opposite sides of the opening to allow the article to be removed from the mandrel in a substantially continuous, uninterrupted operation.

29. A mandrel according to claim 28, wherein said body portion and said stem portion are integrally formed from an elastomeric compound, such as a silicon rubber molding compound.

30. A mandrel according to claim 28, wherein said stem portion and said body portion are formed to include a cavity which extends through said stem portion and into a second cross-section of said body portion; and further comprising means disposed in at least that portion of the cavity which extends into the second cross-section of the body portion for exerting a force on a sidewall of the cavity.

31. A mandrel according to claim 30, wherein said means disposed in the cavity comprises relatively rigid means having a dimension which is greater than a corresponding dimension of the cavity in the body portion of the mandrel.

32. A mandrel according to claim 30, wherein said means disposed in the cavity comprises an elongate rod having a first end portion which extends into that portion of the cavity which extends into the second cross-section of the body portion, and wherein said first end portion of the rod has a dimension which is greater than a corresponding dimension of the cavity in the body portion.

33. A mandrel according to claim 32, wherein said elongate rod has a substantially circular cross-section.

34. A mandrel according to claim 30, wherein said cavity has a substantially circular cross-section and a substantially constant diameter throughout its length.

35. A mandrel according to claim 30, wherein said split has mating facing surfaces, and wherein said force tends to hold the surfaces of the split in mating and facing contact.

36. A mandrel according to claim 28, wherein said body portion is doughnut-shaped, with said at least one opening extending through a central region of said body portion.

37. A mandrel according to claim 28, wherein said body portion and said stem portion, upon which the elastomeric article is formed, have textured surfaces so as to increase the wetability thereof.

38. A mandrel according to claim 37, wherein the surfaces of the body and stem portions are pitted to a depth of approximately 0.0002" to 0.002".

39. A mandrel according to claim 37, wherein said textured surface is pitted to an average depth of approximately 0.0005".

40. A mandrel for making a thin-walled elastomeric article by a dipping process, comprising:
- a body portion formed of an elastically resilient material and having at least one through opening therein, and having a split extending from the opening through a first cross-section of the body portion;
- a stem portion formed of an elastically resilient material extending generally radially outwardly from the body portion;
- wherein said stem portion and said body portion are formed to include a cavity which extends through said stem portion and into a second cross-section of said body portion; and
- means disposed in at least that portion of the cavity which extends into the second cross-section of the body portion for exerting a force on a sidewall of the cavity;
- wherein said means disposed in the cavity comprises an elongate rod having a first end portion disposed in that portion of the cavity which extends into the second cross-section of the body portion, and wherein said first end portion of the rod has a dimension which is greater than a corresponding dimension of the cavity in the body portion.

41. A mandrel according to claim 40, wherein said elongate rod has a second end portion positioned for mounting to a dipping apparatus.

42. A mandrel according to claim 40, wherein said elongate rod has a substantially circular cross-section.

43. A mandrel according to claim 40, wherein said cavity has a substantially circular cross-section and a substantially constant diameter throughout its length.

44. A mandrel according to claim 40, wherein said split has mating facing surfaces, and wherein said force tends to hold the surfaces of the split in mating and facing contact.

45. A mandrel according to claim 40, wherein said body portion is formed from an elastomeric compound, such as silicon rubber molding compound, and wherein said means disposed in the cavity is formed of a metal, such as aluminum.

46. A mandrel according to claim 40, wherein an outer surface of at least one of said body portion and said stem portion is textured so as to increase the wetability thereof.

47. A mandrel according to claim 46, wherein said textured surface is pitted to a depth of approximately 0.0002" to 0.002".

48. A mandrel according to claim 46, wherein said textured surface is pitted to an average depth of approximately 0.0005".

49. A mandrel according to claim 40, wherein said body portion is doughnut-shaped, with said at least one opening extending through a central region of said body portion, and wherein said split extends from the opening through the first cross-section of the body portion adjacent one side of the opening, and wherein said cavity extends along the second cross-section of the body portion adjacent a substantially opposing side of the opening.

50. A mandrel for making a thin-walled elastomeric article by a dipping process, comprising:
- a body portion formed of an elastically resilient material and having at least one through opening therein, and having a split extending from the opening through a first cross-section of the body, at least a portion of said body being elastically movable to allow the split to open for removal of the elastomeric article after formation thereof;
- means for closing the split to form a substantially continuous surface of the mandrel in the vicinity of the split; and
- a stem portion formed of an elastically resilient material extending generally radially outwardly from the body portion;
- wherein said stem portion and said split extending through a cross-section of the body are disposed on generally opposite sides of the opening to allow the article to be removed from the mandrel in a substantially continuous operation; and
- wherein said stem portion and said body portion are formed to include a cavity which extends through said stem portion and into a second cross-section of said body portion;
- means disposed in at least that portion of the cavity which extends into the second cross-section of the body portion for exerting a force on a sidewall of the cavity;
- wherein said means disposed in the cavity is an elongate rod having a first end portion which extends into that portion of the cavity which extends into the second cross-section of the body portion, and wherein said first end portion of the rod has a dimension which is greater than a corresponding dimension of the cavity in the body portion.

51. A mandrel according to claim 50, wherein said body portion and said stem portion have textured surfaces so as to increase the wetability thereof.

52. A mandrel according to claim 51, wherein the surfaces of the body and stem portions are pitted to a depth of approximately 0.0002" to 0.002".

53. A mandrel according to claim 51, wherein said textured surface is pitted to an average depth of approximately 0.0005".

* * * * *